(12) United States Patent
Shiga (10) Patent No.: US 6,625,738 B1
(45) Date of Patent: Sep. 23, 2003

(54) USB APPARATUS THAT TURNS ON COMPUTER POWER SUPPLY USING SIGNALS SUBSTANTIALLY LONGER THAN INFORMATION CONVEYING PULSE WIDTHS WHEN PREDETERMINED OPERATION IS PERFORMED ON INPUT DEVICE

(75) Inventor: Sadakazu Shiga, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/454,621

(22) Filed: Dec. 6, 1999

(30) Foreign Application Priority Data

Dec. 15, 1998 (JP) .......................................... 10-355710

(51) Int. Cl.[7] .............................................. G06F 1/26
(52) U.S. Cl. .......................................... 713/310; 710/67
(58) Field of Search ................................. 713/310, 323, 713/324; 710/67

(56) References Cited

U.S. PATENT DOCUMENTS

| | | | | |
|---|---|---|---|---|
| 5,249,298 A | * | 9/1993 | Bolan et al. ................ | 713/340 |
| 5,553,296 A | * | 9/1996 | Forrest et al. ............... | 713/321 |
| 5,590,343 A | * | 12/1996 | Bolan et al. ................ | 713/300 |
| 5,767,844 A | * | 6/1998 | Stoye ......................... | 345/212 |
| 5,799,196 A | * | 8/1998 | Flannery ..................... | 713/320 |
| 6,092,207 A | * | 7/2000 | Kolinski et al. ............ | 713/323 |
| 6,202,161 B1 | * | 3/2001 | Wang ......................... | 713/310 |
| 6,205,502 B1 | * | 3/2001 | Endo et al. ................. | 710/100 |
| 6,237,100 B1 | * | 5/2001 | Cromer et al. ............. | 713/300 |

FOREIGN PATENT DOCUMENTS

JP 10-312235 11/1998

* cited by examiner

Primary Examiner—Thomas Lee
Assistant Examiner—Albert Wang
(74) Attorney, Agent, or Firm—Brinks Hofer Gilson & Lione (57) ABSTRACT

An apparatus for turning on a computer power supply in which when an input operation of a predetermined key is carried out, predetermined H signals are output to a first signal line and a second signal line of a USB chip provided in a keyboard. Since this signal combination is not a USB standard signal combination, they can be distinguished from ordinary data signals. Since a wake-up device which has received these signals outputs predetermined start-up signals to a main power supply, the main power supply can be turned on. When the main power supply is turned on, connections of a first relay contact and a second relay contact of a switching device switch are switched, whereby first signal lines and second signals between the host computer and a keyboard are connected together, making it possible to carry out communication using the signals. By virtue of this structure, it is possible to start up the host computer whose main power supply is in an off state by operating the keyboard.

81 Claims, 1 Drawing Sheet

FIGURE 1

USB APPARATUS THAT TURNS ON COMPUTER POWER SUPPLY USING SIGNALS SUBSTANTIALLY LONGER THAN INFORMATION CONVEYING PULSE WIDTHS WHEN PREDETERMINED OPERATION IS PERFORMED ON INPUT DEVICE

BACKGROUND OF THE INVENTION

1. Field of the Invention

The present invention relates to a power-on function of, for example, a host computer including a universal serial bus (USB) interface, and more particularly to an apparatus for turning on a computer power supply, which is constructed so as to start up the host computer as a result of an operation of an input device, such as a keyboard, when a main power supply of the host computer is in an off state.

2. Description of the Related Art

In conventional computers, pieces of software are built in as resident programs in order to prevent wasteful energy consumption and to increase the efficiency with which energy is saved when the host computer is not used for a long time.

In executing the resident program, when an input operation is not performed within a predetermined period of time from the most recent operation that has been performed at the input device, such as a keyboard, an operation which changes an electrical power mode of the host computer to a suspend mode is carried out. In the suspend mode, the clock speed of a central processing unit (CPU) is reduced, a drive motor of a hard disk or a floppy disk is stopped, and a display is turned off, so that the amount of electrical current supplied to the host computer for consumption is such that the host computer is set in a low electrical power state.

When the host computer is set in the suspend mode, and the input device, such as a keyboard, is operated, the host computer receives information that the input device has been operated. This information is received in the form of a start-up signal. When this start-up signal is input to the host computer, the clock speed of the CPU returns to its original speed, the hard disk or the floppy disk drive motor is started again, and the display is turned on again. Accordingly, the host computer is restored to the state prior to the suspend mode state.

Personal computer peripheral interfaces that have been primarily used for a long time are serial ports (RS232-C) and Centronics parallel ports. However, these types of peripheral interfaces have the following problems. The first problem is that the transfer speed limit is low. The second problem is that a larger number of ports need to be used when connecting a plurality of devices because only one device can be connected to one port. The third problem is that separate ports need to be provided for connecting a keyboard, a mouse, a display, etc., so that various connectors get crowded on the back side of the personal computers.

To overcome the above-described problems, there has been proposed the USB, which allows various peripheral devices to be connected to only one connector as a result of integrating these interfaces. The USB has been rapidly attracting attention as a standard peripheral interface of the next generation.

However, in the above-described conventional computers, the suspend and restore functions are provided on the assumption that the main power supply of the host computer is in an on state. Therefore, when the main power supply is in an off state, the host computer cannot be started with the above-described software.

There has been a demand for adding value to such computers connected with the USB interface by providing a function that the USB does not have, that is, by providing a key called a power-on key, which allows the host computer to be started by a key input operation at a keyboard.

SUMMARY OF THE INVENTION

Accordingly, it is an object of the present invention to provide an apparatus for turning on a computer power supply, which is constructed so as to start up a host computer including a USB interface by turning on a main power supply as a result of operating an input device when a switch of the main power supply of the host computer is in an off state.

To overcome the above-described conventional problems, according to a basic form of the present invention, there is provided an apparatus for turning on a computer power supply, comprising a host computer; an input device connected to the host computer through an interface; a main power supply for starting up the host computer; and a sub-power supply for applying electrical power to the input device when the main power supply is in an off state; wherein the host computer comprises wake-up means for turning on the main power supply to start up the host computer as a result of a predetermined operation performed at the input device when the main power supply is in an off state.

According to the present invention, when the switch of the main power supply of the host computer is in an off state, and a keyboard, for example, is operated, the main power supply is turned on to start up the host computer.

To make this operation possible, the sub-power supply (which is a battery) of the host computer supplies electrical power to the input device, such as a keyboard, through the interface. Therefore, when the main power supply of the host computer is in an off state, the electrical power level of the host computer is set low (which is also the case when the host computer is set in its ordinary suspend mode).

When the predetermined operation is performed at the input device, the main power supply is turned on. Here, the operation may be performed on a special-purpose power-on key on the keyboard or on any combination of a plurality of keys. The operation may also be performed on a switch of, for example, a mouse for a predetermined time or a predetermined number of times.

In another form of the present invention, an apparatus for turning on a computer power supply may further comprise switching means disposed at the interface, wherein when the main power supply is in an on state, the switching means connects a signal line of the host computer and a signal line of the input device, and wherein when the main power supply is in an off state, the switching means switches connections so that the wake-up means and the signal line of the input device are connected together; and wherein when the main power supply is in the off state, and a predetermined operation is performed at the input device, a start-up signal generated by the wake-up means is applied to the main power supply to turn on the main power supply, whereby the switching means switches connections so that the signal line of the host computer and the signal line of the input device are connected together.

The switching means may be, for example, a relay or a logic circuit.

In this case, when the main power supply is in an off state, the wake-up means and the input means, such as a keyboard, are connected together. When, for example, a predetermined key on the keyboard is operated, the main power supply is turned on by the wake-up means to start up the host computer, and the signal line of the host computer and the signal line of the input device are connected together. Therefore, after the host computer has been started, a signal indicating that the input operation has been performed at the keyboard can be transmitted to the host computer.

In still another form of the present invention, when an apparatus for turning on a computer power supply comprises a host computer, an input device connected to the host computer through an interface, a main power supply for starting up the host computer, and a sub-power supply for applying electrical power to the input device when the main power supply is in an off state, and when the host computer comprises wake-up means, the interface may comprise four signal lines, that is, a universal serial bus standard power supply line, a first signal line, a second signal line, and a ground line. In addition, the wake-up means may comprise first comparing means for detecting whether or not a value of the first signal line is equal to or greater than a predetermined standard value, second comparing means for, detecting whether or not a value of the second signal line is equal to or greater than the predetermined standard value, and an AND circuit for determining a logical OR between the first comparing means and the second comparing means, with the main power supply being turned on when the logical OR reaches a predetermined value.

In still another form of the present invention, when the interface comprises four signal lines, that is, a universal serial bus standard power supply line, a first signal line, a second signal line, and a ground line, and when the wake-up means comprises first comparing means, second comparing means, and an AND circuit, the predetermined operation may be performed at the input device in order to output H signals of a predetermined pulse width to both the first signal line and the second signal line, after which the H signals with a predetermined pulse width equal to or greater than the predetermined pulse width are output from the AND circuit to turn on the power supply.

The communication mode in which both of the first signal line and the second signal line are in an H state result from a combination that does not exist in ordinary USB standard operation modes. Therefore, when the wake-up means is constructed so that it starts up when H signals are applied to both of these lines, there is no obstacle to carrying out ordinary communications using the USB interface. When the communication mode is switched at the USB interface, the first signal line and the second signal line may both be instantaneously set in the H state. When the duration in which the first signal line and the second signal line are in the H state becomes equal to or greater than a predetermined time period (more specifically, a time period which is longer than a USB standard signal transfer rate), and an attempt is made to start up the wake-up means, it is possible to prevent confusion with the case where communication modes are switched by the USB interface.

With the first signal line and the second signal line being set in the H state when the main power supply is on and input from the input device is temporarily stopped, the main power supply can be turned off by setting both the first signal line and the second signal line in an L state for a predetermined period of time as a result of carrying out the predetermined operation at the input device.

DESCRIPTION OF THE PREFERRED EMBODIMENT

A description will now be given of the present invention with reference to the drawing.

Figure 1:
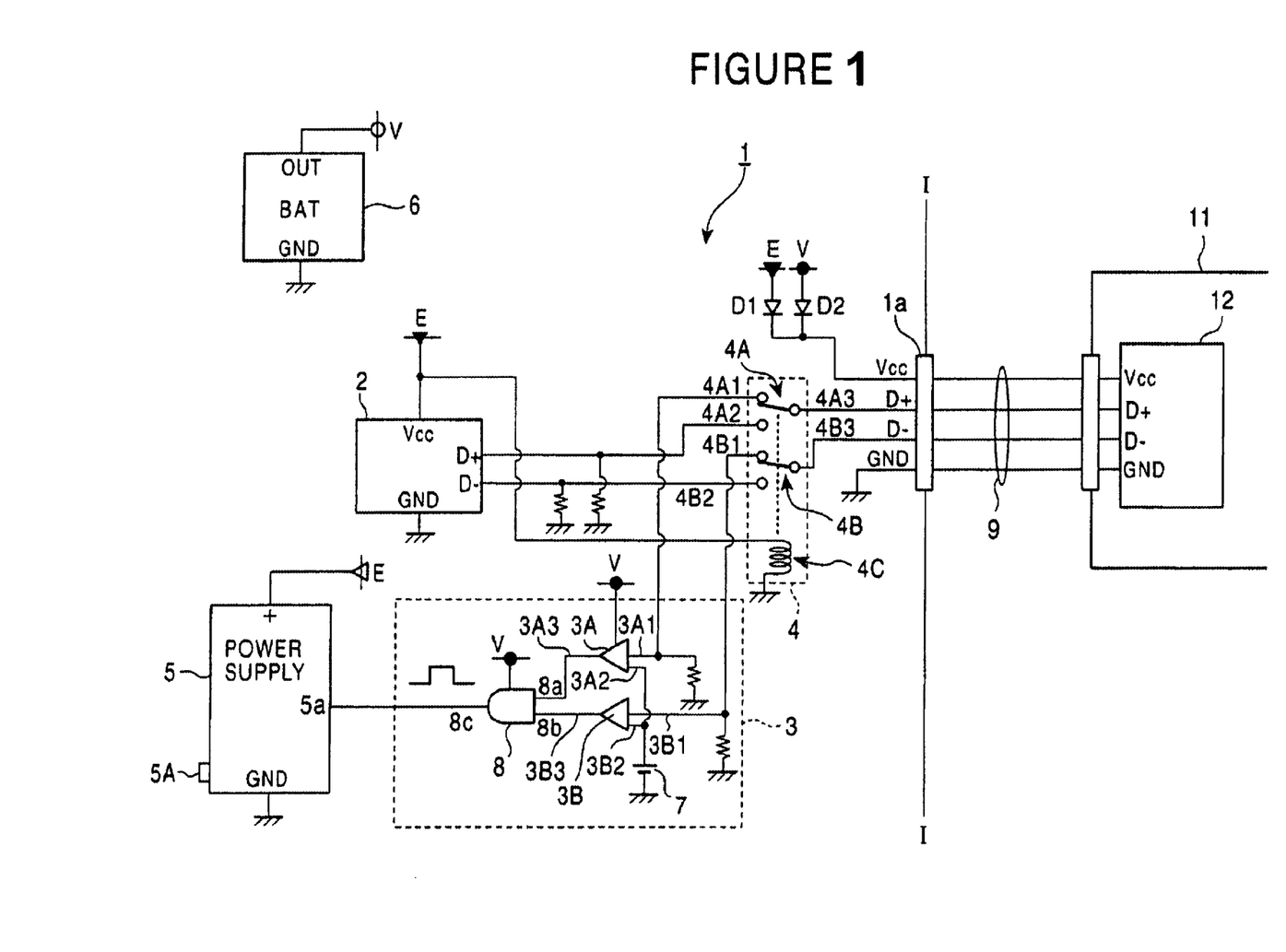
FIG. 1 is a structural view of an embodiment of the apparatus for turning on a computer power supply in accordance with the present invention.

FIG. 1 is a structural view of an embodiment of the apparatus for turning on a computer power supply in accordance with the present invention.

Referring to FIG. 1, a host computer 1 and a keyboard 11 (which is an example of an input device) are disposed on the left and right sides of line I—I, respectively.

In the interior of the host 1 of FIG. 1 are provided a universal serial bus (USB) chip 2 of large-scale integration for a USB interface; a wake-up means 3; a switching means 4; a main power supply 5; and a sub-power supply 6. The USB chip 2 includes a power supply input terminal Vcc, a ground terminal GND, a first signal line D+, and a second signal line D−, which correspond to those in a USB interface specification. FIG. 1 shows only the terminals that are particularly important for the USB interface, so that the rest of the terminals of the USB chip 2 are not shown. In FIG. 1, an output voltage generated between a +terminal and a GND terminal of the main power supply 5 is expressed as E, and an output voltage generated between an OUT terminal and a GND terminal of the sub-power supply 6 is expressed as V. The power supply input terminal Vcc of the USB chip 2 is connected to the +terminal of the main power supply 5, while the GND terminal thereof is grounded to a ground line. The USB chip 2 is thus driven when electrical power is applied thereto from the main power supply 5. It is connected to a central processing unit (CPU) in the host computer 1 by a local bus, and controlled by the CPU.

The wake-up means 3 comprises a first comparing means 3A and a second comparing means 3B, both of which are, for example, OP amplifiers. A first input terminal 3A1 of the first comparing means 3A and a first input terminal 3B1 of the second comparing means 3B are grounded through respective predetermined resistors. A standard voltage 7 (for example, 1.5 volts) is applied to a second input terminal 3A2 of the first comparing means 3A and to a second input terminal 3B2 of the second comparing means 3B. An output terminal 3A3 of the first comparing means 3A is connected to an input terminal 8a of an AND circuit 8 and an output terminal 3B3 of the second comparing means 3B is connected to an input terminal 8b of the AND circuit 8. An output terminal 8c of the AND circuit 8 is connected to a power-on terminal 5a of the main power supply 5. A USB chip 12 is provided in the keyboard 11. It is controlled by, for example, an 8-bit microcomputer (not shown), which is a controlling means (or a signal-generating means) provided in, for example, the keyboard 11. The USB chip 2 provided in the host computer 1 and the USB chip 12 provided in the keyboard 11 are connected together through a USB cable 9.

The switching means 4 is, for example, a relay, and is provided between a connector terminal 1a, provided for the USB cable 9, and the USB chip 2 of the host computer 1. The switching means 4 of FIG. 1 includes a first relay contact 4A and a second relay contact 4B. The first relay contact 4A includes two connecting terminals 4A1 and 4A2 provided at the host computer 1 side, and one connecting terminal 4A3 provided at the keyboard 11 side. Similarly, the second relay contact 4B includes two connecting terminals 4B1 and 4B2 provided at the host computer 1 side, and one connecting terminal 4B3 provided at the keyboard 11 side.

The connecting terminal 4A1 of the first relay contact 4A is connected to the input terminal 3A1 of the first comparing means 3A, and the connecting terminal 4B1 of the second relay contact 4B is connected to the input terminal 3B1 of the second comparing means 3B. The connecting terminal 4A2 of the first relay contact 4A is connected to the first signal line D+ of the USB chip 2, and the connecting terminal 4B2 of the second relay contact 4B is connected to the second signal line D− of the USB chip 2. Through the connecting connector terminal 1a and the USB cable 9, the connecting terminal 4A3 of the first relay contact 4A and the connecting terminal 4B3 of the second relay contact 4B are connected to a first signal line D+ and a second signal line D− of the USB chip 12 in the keyboard 11, respectively. The switching means 4 also includes a relay actuator 4C actuated when electrical power is supplied thereto from the main electrical power 5. The first and the second relay contacts 4A and 4B can be simultaneously actuated and switched by the relay actuator 4C of the switching means 4.

The main power supply 5 includes a power supply switch 5A. When the switch 5A is switched on by a person or when a predetermined signal is input to the power-on terminal 5a, electrical power is supplied to the interior of the host computer 1.

The sub-power supply 6 is, for example, a battery, and supplies electrical power to the first and the second comparing means 3A and 3B of the wake-up means 3 and the AND circuit 8. Outputs of the main power supply 5 and the sub-power supply 6 are connected to diodes D1 and D2 in an OR connection. They are also connected to a power supply input terminal Vcc of the USB chip 12 in the keyboard 11 through the connector terminal 1a and the USB cable 9. In other words, at least one of the main power supply 5 and the sub-power supply 6 supplies electrical power to the keyboard 11. A GND terminal of the keyboard 11 is grounded to a ground line at the host computer 1 side through the connector terminal 1a and the USB cable 9.

Table 1 shows the USB standard signal line states when the host computer 1 is set in the suspend mode.

TABLE 1

|    | Low Speed | Full Speed | Unconnected |
|----|-----------|------------|-------------|
| D+ | L (Hi-Z)  | H          | L (Hi-Z)    |
| D− | H (Hi-Z)  | L (Hi-Z)   | L (Hi-Z)    |

As shown in Table 1, according to the USB standards, there are three signal line state modes. They are a lower speed mode (hereinafter referred to as "LS mode") or a first mode; a full speed mode (hereinafter referred to as "FS mode") or a second mode; and an unconnected mode or a third mode. In the LS mode, the data transfer speed is 1.5 M bits/s. In the FS mode, the data transfer speed is 12 M bits/s. In the unconnected mode, the USB cable 9 is in an unconnected state.

When the host computer 1 is set in the suspend mode, first signal line D+ and second signal line D− in the LS mode are in an L (Hi-Z or high-impedance) state and in an H (high level) state, respectively. In the FS mode, they are in the H state and in the L (Hi-Z) state, respectively. In the unconnected mode, they are both in the L (Hi-Z) state. The state in which both of these first and the second signal lines D+ and D− are in the H state is not a USB standard state.

A description will now be given of the operation of the apparatus for turning on a computer power supply, which has the above-described structure.

When the power supply switch 5A of the main power supply 5 is set in an off state, electrical power supply from the main power supply 5 is stopped. In this case, an operating system (OS) of the host computer 1 is not turned on. Therefore, the operation of the USB chip 2 is stopped.

Since actuating electrical current is not supplied to the relay actuator 4C of the switching means 4, the connecting terminals 4A1 and 4A3 of the first relay contact 4A are connected, and the connecting terminals 4B1 and 4B3 of the second relay contact 4B are also connected. Therefore, the first signal lines D+ of the host computer 1 and the keyboard 11 are not connected to each other, and the second signal lines D− of the host computer 1 and the keyboard 11 are not connected to each other. The first signal line D+ and the second signal line D− of the keyboard 11 are connected to the first input terminals 3A1 and 3B1 of the wake-up means 3, respectively. The first signal line D+ and the second signal line D− of the host computer 1 are pulled down due to a predetermined resistance of 15 kΩ as a result of the USB standards. When the first signal lines D+ of the host computer 1 and the keyboard 11 are not connected to each other, and the second signal lines D− of the host computer 1 and the keyboard 11 are not connected to each other, the first signal line D+ and the second signal line D− at the host computer 1 side are set in the L level.

From the sub-power supply 6, the output voltage V is applied to the wake-up means 3. In this case, the amount of electrical current supplied to the wake-up means 3 is equal to or greater than 500 μA, and the mode is set in a low electrical power mode lust as in the case where the host computer 1 is set in the suspend mode. The output voltage V from the sub-power supply 6 is also applied to the keyboard 11 through the diode D2, the connector terminal 1a, the USB cable 9 and the power supply input terminal Vcc of the USB chip 12.

When the power-on key on the keyboard 11 is operated, or when a plurality of keys on the keyboard 11 are operated at the same time, predetermined signals are output towards the host computer 1 through the first signal line D+ and the second signal line D− of the USB chip 12 in the keyboard 11. These predetermined signals are generated by the aforementioned 8-bit microcontroller (not shown), which is a controlling means (or signal-generating means) at the keyboard 11 side. The first signal line D+ and the second signal line D− are in a fourth mode in which both signal lines D+ and D− are in the H state. The pulse width and the pulse voltage of the predetermined signals are, for example, 50 ms and 3 volts, respectively.

The fourth mode of first signal line D+ and second signal line D− in which both of them are in the H level state is not shown in Table 1 because it is not a USB standard mode. Taking into account that the data transfer speed of the USB is measured in nanoseconds (nsec), it can be said that a pulse width of 50 ms is very large. Therefore, even when fourth mode signals (H level signals with a pulse width of 50 ms) are set as signals that are not USB standard signals, and then transmitted to first signal line D+ and second signal line D−, they can be easily distinguished from USB standard data signals.

When such fourth mode signals are transmitted from the keyboard 11, they are input to the USB cable 9, the connector terminal 1a, and the first input terminal 3A1 of the first comparing means 3A and the first input terminal 3B1 of the second comparing means 3B of the wake-up means 3 through the first relay contact 4A and the second relay contact 4B of the switching means 4, respectively. In other words, the fourth mode signals are input to the first input terminal 3A1 of the first comparing means 3A and the first input terminal 3B1 of the second comparing means 3B. The first and the second comparing means 3A and 3B make a comparison between the voltages of the fourth mode signals and the standard voltage 7 (1.5 volts). Only when the fourth mode signals have a voltage greater than the standard voltage 7 are the H signals output from the output terminals 3A3 and 3B3. In other words, the first and the second comparing means 3A and 3B act as comparators.

When the H signals are output from the output terminal 3A3 of the first comparing means 3A and the output terminal 3B3 of the second comparing means 3B at the same time, the AND circuit 8 which has received these signals also outputs the H signals with the pulse width of 50 msec. When the H signals are input to the power-on terminal 5a of the main power supply 5, the main power supply 5 is turned on.

When the main power supply 5 is turned on, electrical power is applied to the host computer 1, the USB chip 2, the relay actuator 4C of the switching means 4, etc. When a predetermined amount of actuating electrical current is supplied from the main power supply 5 to the relay actuator 4C of the switching means 4, the connecting terminals 4A2 and 4A3 of the first relay contact 4A are connected together, and the connecting terminals 4B2 and 4B3 of the second relay contact 4B are connected together. Therefore, the first signal lines D+ of the host computer 1 and the keyboard 11, and the second lines D– of the host computer 1 and the keyboard 11 are connected together, making it possible to allow transmission of signals between the host computer 1 and the keyboard 11.

Since the operating system existing as a resident program in the host computer 1 is started up as a result of supplying electrical power to the host computer 1, the host computer 1 is started in order to set an environment that allows an input operation to be performed at the keyboard 11.

The power supply turn-on apparatus of the present invention can be powered down when the keyboard 11 is not operated for a long time.

For example, when communication is not carried out from the keyboard 11 to the host computer 1, application of H (high level) signals is continued from the aforementioned 8-bit microcomputer (which is a controlling means or a signal-generating means disposed at the keyboard 11 side) to the first signal line D+ and the second signal line D– of the USB chip 2 of the host computer 1 through the USB chip 12. When a predetermined key on the keyboard 11 is operated, L signals are output from the 8-bit microcomputer to first signal line D+ and second signal line D– for, for example, 25 msec. When the L signals are applied to the USB chip 2, the USB chip 2 is put in a state that is identical to the pull-down state that occurs when the keyboard 11 is not connected. This state of the USB chip 2 is detected at the host computer 1 side, and the main power supply is turned off.

As can be understood from the foregoing description, when the main power supply of the host computer is turned off, that is, when it is in the power-off state, and the input device, such as a keyboard, is operated, the host computer can be started.

It is possible to add value to a computer by allowing a host computer to be started by making use of a combination of signals that are not USB standard signals at the USB interface.

What is claimed is:

1. An apparatus for turning on a computer power supply, comprising:

a host computer;
an input device connected to the host computer through an interface, the interface supplying data and power to the input device;
a main power supply to supply power to the host computer; and
a sub-power supply to supply power to the input device when the main power supply is in an off state;
wherein the host computer comprises wake-up means for turning on the main power supply to power the host computer as a result of a predetermined operation performed at the input device when the main power supply is in the off state,
wherein the apparatus further comprises switching means disposed at the interface, wherein when the main power supply is in an on state, the switching means connects a signal line of the host computer and a signal line of the input device, and wherein when the main power supply is in the off state, the switching means switches connection so that the wake-up means and the signal line of the input device are connected together; and wherein when the main power supply is in the off state, and the predetermined operation is performed at the input device, a start-up signal generated by the wake-up means is applied to the main power supply to turn on the main power supply, whereby the switching means switches connections so that the signal line of the host computer and the signal line of the input device are connected together,
wherein the interface comprises four signal lines: a universal serial bus standard power supply line, a first signal line, a second signal line, and a ground line; and wherein the wake-up means comprises first comparing means for detecting whether a value of the first signal line is at least a predetermined standard value, second comparing means for detecting whether a value of the second signal line is at least the predetermined standard value, and an AND circuit logically ANDing the first comparing means and the second comparing means, with the main power supply being turned on when an output of the AND circuit reaches a predetermined value, and
wherein when the predetermined operation is performed at the input device, H signals of a first predetermined pulse width are output to both the first signal line and the second signal line, after which the H signals with a second predetermined pulse width of at least the first predetermined pulse width are output from the AND circuit to turn on the main power supply.

2. An apparatus for turning on a computer power supply according to claim 1, wherein the first predetermined pulse width is substantially greater than a standard pulse width for signals transmitted between the host computer and input device through the interface when the host computer is the main power supply is turned on.

3. An apparatus for turning on a computer power supply according to claim 1, wherein the predetermined operation consists of performing a plurality of individual operations at the input device.

4. An apparatus for turning on a computer power supply according to claim 1, wherein the input device is a keyboard and the predetermined operation consists of activating a plurality of different keys on the keyboard.

5. An apparatus for turning on a computer power supply according to claim 1, wherein the predetermined operation consists of performing a single operation at the input device.

6. An apparatus for turning on a computer power supply according to claim 1, wherein the input device is a keyboard and the predetermined operation consists of activating only one key on the keyboard.

7. An apparatus for turning on a computer power supply according to claim 1, wherein the apparatus is configured to use an interface signal state that is undefined when the main power supply is turned on to turn on the main power supply.

8. An apparatus for turning on a computer power supply according to claim 1, wherein the input device supplies signals to the host computer that consist of an interface signal state that is undefined when the main power supply is turned on to turn on the main power supply.

9. An apparatus for turning on a computer power supply according to claim 8, wherein the interface is a universal serial bus.

10. An apparatus for turning on a computer power supply according to claim 9, wherein the interface signal state is a high/high $D^+/D^-$ signal.

11. An apparatus for turning on a computer power supply according to claim 10, wherein widths of the high/high $D^+/D^-$ signal are substantially longer than the standard widths of $D^+/D^-$ signals that convey information between the host computer and the input device.

12. An apparatus for turning on a computer power supply according to claim 1, wherein operations on the input device subsequent to the predetermined operation transmit non-power-related input information from the input device to the host computer.

13. An apparatus for turning on a computer power supply according to claim 1, wherein the apparatus is configured such that when the main power supply is in an on state and the predetermined operation is performed at the input device, the main power supply is turned off.

14. An apparatus for turning on a computer power supply according to claim 1, wherein the sub-power supply applies electrical power to the input device only when the main power supply is in the off state.

15. An apparatus for turning on a computer power supply according to claim 14, wherein the main power supply applies electrical power to the input device only when the main power supply is in an on state.

16. An apparatus for turning on a computer power supply, comprising:
    a host computer;
    an input device connected to the host computer through an interface;
    a main power supply to power the host computer and the input device when the main power supply is in an on state; and
    a sub-power supply to apply power to the input device through the interface when the main power supply is in an off state;
    wherein the host computer comprises wake-up means for turning on the main power supply as a result of a predetermined operation performed at the input device when the main power supply is in the off state,
    wherein the apparatus further comprises switching means disposed at the interface, wherein when the main power supply is in the on state, the switching means connects a signal line of the host computer and a signal line of the input device, and wherein when the main power supply is in the off state, the switching means switches connection so that the wake-up means and the signal line of the input device are connected together; and
    wherein when the main power supply is in the off state, and the predetermined operation is performed at the input device, a start-up signal generated by the wake-up means is applied to the main power supply to turn on the main power supply, whereby the switching means switches connections so that the signal line of the host computer and the signal line of the input device are connected together,
    wherein the interface comprises four signal lines: a universal serial bus standard power supply line, a first signal line, a second'signal line, and a ground line; and wherein the wake-up means comprises first comparing means for detecting whether a value of the first signal line is at least a predetermined standard value, second comparing means for detecting whether a value of the second signal line is at least the predetermined standard value, and an AND circuit logically ANDing the first comparing means and the second comparing means, with the main power supply being turned on when an output of the AND circuit reaches a predetermined value, and
    wherein when the predetermined operation is performed at the input device, H signals of a first predetermined pulse width are output to both the first signal line and the second signal line, after which the H signals with a second predetermined pulse width of at least the first predetermined pulse width are output from the AND circuit to turn on the power supply.

17. The apparatus of claim 16, wherein the first predetermined pulse width is substantially greater than a standard pulse width for signals transmitted between the host computer and input device through the interface when the host computer is the main power supply is turned on.

18. The apparatus of claim 16, wherein the predetermined operation consists of performing a plurality of individual operations at the input device.

19. The apparatus of claim 16, wherein the input device is a keyboard and the predetermined operation consists of activating a plurality of different keys on the keyboard.

20. The apparatus of claim 16, wherein the predetermined operation consists of performing a single operation at the input device.

21. The apparatus of claim 16, wherein the input device is a keyboard and the predetermined operation consists of activating only one key on the keyboard.

22. The apparatus of claim 16, wherein the apparatus is configured to use an interface signal state that is undefined when the main power supply is turned on to turn on the main power supply.

23. The apparatus of claim 16, wherein the input device supplies signals to the host computer that consist of an interface signal state that is undefined when the main power supply is turned on to turn on the main power supply.

24. The apparatus of claim 23, wherein the interface is a universal serial bus.

25. The apparatus of claim 24, wherein the interface signal state is a high/high $D^+/D^-$ signal.

26. The apparatus of claim 25, wherein widths of the high/high $D^+/D^-$ signal are substantially longer than the standard widths of $D^+/D^-$ signals that convey information between the host computer and the input device.

27. The apparatus of claim 16, wherein operations on the input device subsequent to the predetermined operation transmit non-power-related input information from the input device to the host computer.

28. The apparatus of claim 16, wherein the apparatus is configured such that when the main power supply is in an on state and the predetermined-operation is performed at the input device, the main power supply is turned off.

29. An apparatus for turning on a computer power supply, comprising:

a host computer;

an input device connected to the host computer through an interface that supplies data and power between the host computer and the input device;

a main power supply that supplies power to the host computer and the input device when the main power supply is in an on state; and a sub-power supply that supplies power to the input device through the interface when the main power supply is in an off state;

wherein the host computer comprises wake-up means that enables the main power supply to supply the host computer with power as a result of a predetermined operation performed at the input device when the main power supply is in the off state, wherein the apparatus further comprises switching means disposed at the interface, wherein when the main power supply is in an on state, the switching means connects a signal line of the host computer and a signal line of the input device, and wherein when the main power supply is in the off state, the switching means switches connection so that the wake-up means and the signal line of the input device are connected together, wherein when the main power supply is in the off state, and the predetermined operation is performed at the input device, a start-up signal generated by the wake-up means is applied to the main power supply to turn on the main power supply, whereby the switching means switches connections so that the signal line of the host computer and the signal line of the input device are connected together, wherein the interface comprises four signal lines: a universal serial bus standard power supply line, a first signal line, a second signal line, and a ground line; and wherein the wake-up means comprises first comparing means for detecting whether a value of the first signal line is at least a predetermined standard value, second comparing means for detecting whether a value of the second signal line is at least the predetermined standard value, and an AND circuit logically ANDing the first comparing means and the second comparing means, with the main power supply being turned on when an output of the AND circuit reaches a predetermined value, and wherein when the predetermined operation is performed at the input device, H signals of a first predetermined pulse width are output to both the first signal line and the second signal line, after which the H signals with a second predetermined pulse width of at least the first predetermined pulse width are output from the AND circuit to turn on the power supply.

30. The apparatus of claim 29, wherein the first predetermined pulse width is substantially greater than a standard pulse width for signals transmitted between the host computer and input device through the interface when the host computer is the main power supply is turned on.

31. The apparatus of claim 29, wherein the predetermined operation consists of performing a plurality of individual operations at the input device.

32. The apparatus of claim 29, wherein the input device is a keyboard and the predetermined operation consists of activating a plurality of different keys on the keyboard.

33. The apparatus of claim 29, wherein the predetermined operation consists of performing a single operation at the input device.

34. The apparatus of claim 29, wherein the input device is a keyboard and the predetermined operation consists of activating only one key on the keyboard.

35. The apparatus of claim 29, wherein the apparatus is configured to use an interface signal state that is undefined when the main power supply is turned on to turn on the main power supply.

36. The apparatus of claim 29, wherein the input device supplies signals to the host computer that consist of an interface signal state that is undefined when the main power supply is turned on to turn on the main power supply.

37. The apparatus of claim 36, wherein the interface is a universal serial bus.

38. The apparatus of claim 37, wherein the interface signal state is a high/high $D^+/D^-$ signal.

39. The apparatus of claim 38, wherein widths of the high/high $D^+/D^-$ signal are substantially longer than the standard widths of $D^+/D^-$ signals that convey information between the host computer and the input device.

40. The apparatus of claim 29, wherein operations on the input device subsequent to the predetermined operation transmit non-power-related input information from the input device to the host computer.

41. The apparatus of claim 29, wherein the apparatus is configured such that when the main power supply is in an on state and the predetermined operation is performed at the input device, the main power supply is turned off.

42. The apparatus of claim 29, wherein the sub-power supply applies electrical power to the input device only when the main power supply is in the off state.

43. The apparatus of claim 42, wherein the main power supply applies electrical power to the input device only when the main power supply is in an on state.

44. An apparatus for turning on a computer power supply, comprising:

a host computer;

an input device connected to the host computer through an interface, the interface supplying data and power to the input device;

a main power supply to supply power to the host computer; and a sub-power supply to supply power to the input device when the main power supply is in an off state;

wherein the host computer comprises wake-up means for turning on the main power supply to power the host computer as a result of a predetermined operation performed at the input device when the main power supply is in the off state, and wherein the input device supplies signals to the host computer that consist of an interface signal state that is undefined when the main power supply is turned on to turn on the main power supply, the interface is a universal serial bus, the interface signal state is a high/high $D^+/D^-$ signal, and widths of the high/high $D^+/D^-$ signal are substantially longer than the standard widths of $D^+/D^-$ signals that convey information between the host computer and the input device.

45. An apparatus for turning on a computer power supply according to claim 44, further comprising switching means disposed at the interface, wherein when the main power supply is in an on state, the switching means connects a signal line of the host computer and a signal line of the input device, and wherein when the main power supply is in the off state, the switching means switches connection so that the wake-up means and the signal line of the input device are connected together; and wherein when the main power supply is in the off state, and the predetermined operation is performed at the input device, a start-up signal generated by the wake-up means is applied to the main power supply to turn on the main power supply, whereby the switching means switches connections so that the signal line of the host computer and the signal line of the input device are connected together.

46. An apparatus for turning on a computer power supply according to claim 44, wherein the interface comprises four signal lines: a universal serial bus standard power supply line, a first signal line, a second signal line, and a ground line; and wherein the wake-up means comprises first comparing means for detecting whether a value of the first signal line is at least a predetermined standard value, second comparing means for detecting whether a value of the second signal line is at least the predetermined standard value, and an AND circuit logically ANDing the first comparing means and the second comparing means, with the main power supply being turned on when an output of the AND circuit reaches a predetermined value.

47. An apparatus for turning on a computer power supply according to claim 46, wherein when the predetermined operation is performed at the input device, H signals of a first predetermined pulse width are output to both the first signal line and the second signal line, after which the H signals with a second predetermined pulse width of at least the first predetermined pulse width are output from the AND circuit to turn on the main power supply.

48. An apparatus for turning on a computer power supply according to claim 47, wherein the first predetermined pulse width is substantially greater than a standard pulse width for signals transmitted between the host computer and input device through the interface when the host computer is the main power supply is turned on.

49. An apparatus for turning on a computer power supply according to claim 44, wherein the predetermined operation consists of performing a plurality of individual operations at the input device.

50. An apparatus for turning on a computer power supply according to claim 44, wherein the input device is a keyboard and the predetermined operation consists of activating a plurality of different keys on the keyboard.

51. An apparatus for turning on a computer power supply according to claim 44, wherein the predetermined operation consists of performing a single operation at the input device.

52. An apparatus for turning on a computer power supply according to claim 44, wherein the input device is a keyboard and the predetermined operation consists of activating only one key on the keyboard.

53. An apparatus for turning on a computer power supply according to claim 44, wherein operations on the input device subsequent to the predetermined operation transmit non-power-related input information from the input device to the host computer.

54. An apparatus for turning on a computer power supply according to claim 44, wherein the apparatus is configured such that when the main power supply is in an on state and the predetermined operation is performed at the input device, the main power supply is turned off.

55. An apparatus for turning on a computer power supply according to claim 44, wherein the sub-power supply applies electrical power to the input device only when the main power supply is in the off state.

56. An apparatus for turning on a computer power supply according to claim 55, wherein the main power supply applies electrical power to the input device only when the main power supply is in an on state.

57. An apparatus for turning on a computer power supply, comprising:

a host computer;

an input device connected to the host computer through an interface;

a main power supply to power the host computer and the input device when the main power supply is in an on state; and a sub-power supply to apply power to the input device through the interface when the main power supply is in an off state;

wherein the host computer comprises wake-up means for turning on the main power supply as a result of a predetermined operation performed at the input device when the main power supply is in the off state, the input device supplies signals to the host computer that consist of an interface signal state that is undefined when the main power supply is turned on to turn on the main power supply, the interface is a universal serial bus, the interface signal state is a high/high $D^+/D^-$ signal, and widths of the high/high $D^+/D^-$ signal are substantially longer than the standard widths of $D^+/D^-$ signals that convey information between the host computer and the input device.

58. The apparatus of claim 57, further comprising switching means disposed at the interface, wherein when the main power supply is in the on state, the switching means connects a signal line of the host computer and a signal line of the input device, and wherein when the main power supply is in the off state, the switching means switches connection so that the wake-up means and the signal line of the input device are connected together; and wherein when the main power supply is in the off state, and the predetermined operation is performed at the input device, a start-up signal generated by the wake-up means is applied to the main power supply to turn on the main power supply, whereby the switching means switches connections so that the signal line of the host computer and the signal line of the input device are connected together.

59. The apparatus of claim 57, wherein the interface comprises four signal lines: a universal serial bus standard power supply line, a first signal line, a second signal line, and a ground line; and wherein the wake-up means comprises first comparing means for detecting whether a value of the first signal line is at least a predetermined standard value, second comparing means for detecting whether a value of the second signal line is at least the predetermined standard value, and an AND circuit logically ANDing the first comparing means and the second comparing means, with the main power supply being turned on when an output of the AND circuit reaches a predetermined value.

60. The apparatus of claim 59, wherein when the predetermined operation is performed at the input device, H signals of a first predetermined pulse width are output to both the first signal line and the second signal line, after which the H signals with a second predetermined pulse width of at least the first predetermined pulse width are output from the AND circuit to turn on the power supply.

61. The apparatus of claim 60, wherein the first predetermined pulse width is substantially greater than a standard pulse width for signals transmitted between the host computer and input device through the interface when the host computer is the main power supply is turned on.

62. The apparatus of claim 58, wherein the predetermined operation consists of performing a plurality of individual operations at the input device.

63. The apparatus of claim 58, wherein the input device is a keyboard and the predetermined operation consists of activating a plurality of different keys on the keyboard.

64. The apparatus of claim 58, wherein the predetermined operation consists of performing a single operation at the input device.

65. The apparatus of claim 58, wherein the input device is a keyboard and the predetermined operation consists of activating only one key on the keyboard.

66. The apparatus of claim 58, wherein the apparatus is configured to use an interface signal state that is undefined when the main power supply is turned on to turn on the main power supply.

67. The apparatus of claim 58, wherein operations on the input device subsequent to the predetermined operation transmit non-power-related input information from the input device to the host computer.

68. The apparatus of claim 58, wherein the apparatus is configured such that when the main power supply is in an on state and the predetermined operation is performed at the input device, the main power supply is turned off.

69. An apparatus for turning on a computer power supply, comprising:

a host computer;

an input device connected to the host computer through an interface that supplies data and power between the host computer and the input device;

a main power supply that supplies power to the host computer and the input device when the main power supply is in an on state; and a sub-power supply that supplies power to the input device through the interface when the main power supply is in an off state;

wherein the host computer comprises wake-up means that enables the main power supply to supply the host computer with power as a result of a predetermined operation performed at the input device when the main power supply is in the off state, wherein the input device supplies signals to the host computer that consist of an interface signal state that is undefined when the main power supply is turned on to turn on the main power supply, the interface is a universal serial bus, the interface signal state is a high/high $D^+/D^-$ signal, and widths of the high/high $D^+/D^-$ signal are substantially longer than the standard widths of $D^+/D^-$ signals that convey information between the host computer and the input device.

70. The apparatus of claim 69, further comprising switching means disposed at the interface, wherein when the main power supply is in an on state, the switching means connects a signal line of the host computer and a signal line of the input device, and wherein when the main power supply is in the off state, the switching means switches connection so that the wake-up means and the signal line of the input device are connected together; and wherein when the main power supply is in the off state, and the predetermined operation is performed at the input device, a start-up signal generated by the wake-up means is applied to the main power supply to turn on the main power supply, whereby the switching means switches connections so that the signal line of the host computer and the signal line of the input device are connected together.

71. The apparatus of claim 69, wherein the interface comprises four signal lines: a universal serial bus standard power supply line, a first signal line, a second signal line, and a ground line; and wherein the wake-up means comprises first comparing means for detecting whether a value of the first signal line is at least a predetermined standard value, second comparing means for detecting whether a value of the second signal line is at least the predetermined standard value, and an AND circuit logically ANDing the first comparing means and the second comparing means, with the main power supply being turned on when an output of the AND circuit reaches a predetermined value.

72. The apparatus of claim 71, wherein when the predetermined operation is performed at the input device, H signals of a first predetermined pulse width are output to both the first signal line and the second signal line, after which the H signals with a second predetermined pulse width of at least the first predetermined pulse width are output from the AND circuit to turn on the power supply.

73. The apparatus of claim 72, wherein the first predetermined pulse width is substantially greater than a standard pulse width for signals transmitted between the host computer and input device through the interface when the host computer is the main power supply is turned on.

74. The apparatus of claim 69, wherein the predetermined operation consists of performing a plurality of individual operations at the input device.

75. The apparatus of claim 69, wherein the input device is a keyboard and the predetermined operation consists of activating a plurality of different keys on the keyboard.

76. The apparatus of claim 69, wherein the predetermined operation consists of performing a single operation at the input device.

77. The apparatus of claim 69, wherein the input device is a keyboard and the predetermined operation consists of activating only one key on the keyboard.

78. The apparatus of claim 69, wherein operations on the input device subsequent to the predetermined operation transmit non-power-related input information from the input device to the host computer.

79. The apparatus of claim 69, wherein the apparatus is configured such that when the main power supply is in an on state and the predetermined operation is performed at the input device, the main power supply is turned off.

80. The apparatus of claim 69, wherein the sub-power supply applies electrical power to the input device only when the main power supply is in the off state.

81. The apparatus of claim 80, wherein the main power supply applies electrical power to the input device only when the main power supply is in an on state.

* * * * *

UNITED STATES PATENT AND TRADEMARK OFFICE
CERTIFICATE OF CORRECTION

PATENT NO.     : 6,625,738 B1
DATED          : September 23, 2003
INVENTOR(S)    : Sadakazu Shiga It is certified that error appears in the above-identified patent and that said Letters Patent is hereby corrected as shown below:

Column 10,
Line 8, delete "second'signal" and substitute -- second signal -- in its place.
Line 64, delete "predetermined-operation" and substitute -- predetermined operation -- in its place.

Signed and Sealed this

Sixth Day of January, 2004

JAMES E. ROGAN
*Director of the United States Patent and Trademark Office*